Patented Oct. 20, 1931　　　　　　　　　　　　　　　　　1,828,708

UNITED STATES PATENT OFFICE

HAROLD JAMES TATTERSALL, OF SWINTON, MANCHESTER, ENGLAND, ASSIGNOR TO E. I. DU PONT DE NEMOURS & COMPANY, OF WILMINGTON, DELAWARE

PREVENTION OF THE DEVELOPMENT OF RANCIDITY IN VEGETABLE OILS

No Drawing. Application filed March 5, 1930, Serial No. 433,507, and in Great Britain March 7, 1929.

This invention relates to the manufacture of leather cloth and the like. In such manufacture, it is usual to employ a softener, castor oil often being chosen for that purpose, especially in connection with nitrocellulose films. The disadvantage of using raw castor oil to soften nitrocellulose films is well known, viz., rancidification of the oil occurs with greater or lesser speed, depending on the pigment and other factors, with consequent loss of softening power and development of unpleasant odour. Various methods have been suggested from time to time as a means to overcome this disadvantage. These, in the main, involve the use of addition to the oil or the nitrocotton-castor oil mixture of small quantities of antioxidants.

The object of the present invention is to provide a method for overcoming the disadvantage referred to above, without the necessity of employing antioxidants.

The invention is based on the known fact that certain unsaturated compounds react with peracetic acid to form acetoxyglycollic derivatives. Trilinolein is such a compound. In the presence of peracetic acid and under suitable conditions it forms 11, 11′, 11″:14, 14′, 14″—hexahydroxy—10, 10′, 10″:13, 13′, 13″—hexacetoxy trilinolein which under the influence of oxidizing agents does not give rise to n-caproyl aldehyde, one of the evil-smelling constituents of rancid castor oil.

As the rate of oxidation of trilinolein in castor oil is greater than that of its associated glycerides, triolein and triricinolein it is found, for the purposes of the present invention to be unnecessary to convert the whole of the oil into the acetoxyglycollic derivative. In practice, therefore, sufficient peracetic acid is added to attack the trilinolein constituent of castor oil. I term such treated castor oil "peracetylated castor oil".

The invention consists in a method for preventing rancidity of castor oil or the like, for example, in connection with the manufacture of artificial leather or the like by means of nitrocellulose, which comprises treatment of the oil with peracetic acid, its substitutes or derivatives, particularly for the formation of peracetylated castor oil or the like.

The invention also consists in processes for the reduction of rancidity of castor oil or the like, especially in connection with leather cloth or like manufacture, substantially as herein described.

The invention also consists in products such as may be prepared by processes substantially as herein described, or by the equivalents of those processes, and includes peracetylated vegetable oils containing mixtures of unsaturated glycerides, for example, peracetylated castor oil, as new substances or compositions.

The following example illustrates how the invention may be carried into effect, references to parts being to parts by weight:—

*Example.*—A peracetylated castor oil is formed from the following mixture:—

| | Parts |
|---|---|
| Castor oil | 2170 |
| Hydrogen peroxide (100 vol.) | 37 |
| Acetic acid (glacial) | 92 |
| Sulphuric acid (concentrated) | 0.78 |

The mixture is shaken and may be used immediately, or as required, because apparently peracetylation of the castor oil occurs to a limited extent only at this stage, and is completed subsequently.

A satisfactory mixture from which to make leather cloth is as follows:—

| | Parts |
|---|---|
| Nitrocotton | 44 |
| Dry pigment | 47 |
| Peracetylated castor oil | 98 |
| Solvent | 180 |

The dry pigment is dispersed in the peracetylated castor oil in the usual manner of dispersing pigments in oil.

Leather cloth made in this manner does not appear to rancidify even though retained for a considerable time at high temperatures in the presence of oxygen.

*General.*—In leather cloth, for example, the completion of peracetylation appears to occur with liberation of water. The act of expelling excess solvent from the leather cloth subsequent to spreading appears sufficient to cause loss of water. The more nearly the temperature of spreading approaches about 100° C., the more nearly do the most suitable conditions for peracetylation appear to be reached.

The invention is not limited to the example given above, nor to the treatment of castor oil. It may be applied to any vegetable oil containing unsaturated glycerides, for example, linseed oil, or cotton seed oil.

Having now described my invention, what I claim as new and desire to secure by Letters Patent is:—

1. Method of treating a vegetable oil containing an unsaturated glyceride to prevent rancidity which comprises intimately mixing said oil with a compound selected from the group comprising peracetic acid and derivatives of peracetic acid.

2. Method of treating castor oil to prevent rancidity which comprises intimately mixing said oil with peracetic acid.

3. A new product comprising a peracetylated vegetable oil.

4. A new product comprising peracetylated castor oil.

5. A new product comprising a vegetable oil containing an unsaturated glyceride, which oil has been treated with peracetic acid.

6. A new product comprising castor oil which has been mixed with peracetic acid.

7. The process which consists in mixing together the following bodies in substantially the proportions specified, namely:—

|  | Parts |
|---|---|
| Castor oil | 2170 |
| Hydrogen peroxide (100 vol.) | 37 |
| Acetic acid (glacial) | 92 |
| Sulphuric acid (concentrated) | 0.78 |

In testimony whereof I have signed my name to this specification.

HAROLD JAMES TATTERSALL.